United States Patent [19]

Kobayashi

[11] 4,216,750

[45] Aug. 12, 1980

[54] AIR-TO-FUEL RATIO CONTROL APPARATUS

[75] Inventor: Akio Kobayashi, Kariya, Japan

[73] Assignee: Nippondenso Co., Ltd, Kariya, Japan

[21] Appl. No.: 891,381

[22] Filed: Mar. 29, 1978

[30] Foreign Application Priority Data

May 26, 1977 [JP] Japan .................. 52-61394

[51] Int. Cl.$^2$ .............................................. F02P 5/04
[52] U.S. Cl. ..................................... 123/435; 123/438
[58] Field of Search ......... 123/119 EC, 119 R, 117 R, 123/117 D, 32 EA, 32 EB, 148 E, 146.5 A

[56] References Cited

U.S. PATENT DOCUMENTS

| | | | |
|---|---|---|---|
| 3,705,573 | 12/1972 | Palazzetti et al. | 123/146.5 A |
| 3,789,816 | 2/1974 | Taplin et al. | 123/139 AW |
| 3,875,912 | 4/1975 | Bullo | 123/148 E |
| 3,896,780 | 7/1975 | Kondo | 123/148 E |
| 3,957,023 | 5/1976 | Peterson | 123/148 E |
| 3,981,282 | 9/1976 | Ford | 123/117 R |
| 4,054,111 | 10/1977 | Sand | 123/117 D |
| 4,063,538 | 12/1977 | Powell et al. | 123/117 R |
| 4,082,069 | 4/1978 | Mayer | 123/32 EB |
| 4,085,714 | 4/1978 | Haddon et al. | 123/117 R |
| 4,092,955 | 6/1978 | Reddy | 123/32 EA |
| 4,095,576 | 6/1978 | Haddon et al. | 123/117 R |
| 4,130,096 | 12/1978 | Ford | 123/117 R |
| 4,131,097 | 12/1978 | Farrada et al. | 123/117 R |

Primary Examiner—Charles J. Myhre
Assistant Examiner—Raymond A. Nelli
Attorney, Agent, or Firm—Cushman, Darby & Cushman

[57] ABSTRACT

An air-to-fuel ratio control apparatus for a combustion engine which attains the combustion on combustible mixture in the engine cylinder to rotate the engine output shaft. A piezoelectric pressure detector secured to the combustion engine detects a pressure in the engine cylinder and three rotational position detectors respectively detect a first, second and third rotational positions of the engine output shaft. The second rotational position is determined to be intermediate between the first and third rotational positions and correspond to the transition point from compression to power strokes of the combustion engine. An electronic circuit compares a portion of and another portion of a pressure signal produced by the pressure detector during respective rotational intervals determined by the first and second rotational positions and by the second and third rotational positions to discriminate whether the combustion engine attained a complete combustion or not. The combustible mixture supplied to the engine cylinder is controlled to a lean limit so long as the complete combustion is attained. The pressure responsive control is prevented when an air-to-fuel ratio detector detects that the combustible mixture subjected to the combustion is richer than the stoichiometric mixture.

4 Claims, 2 Drawing Figures

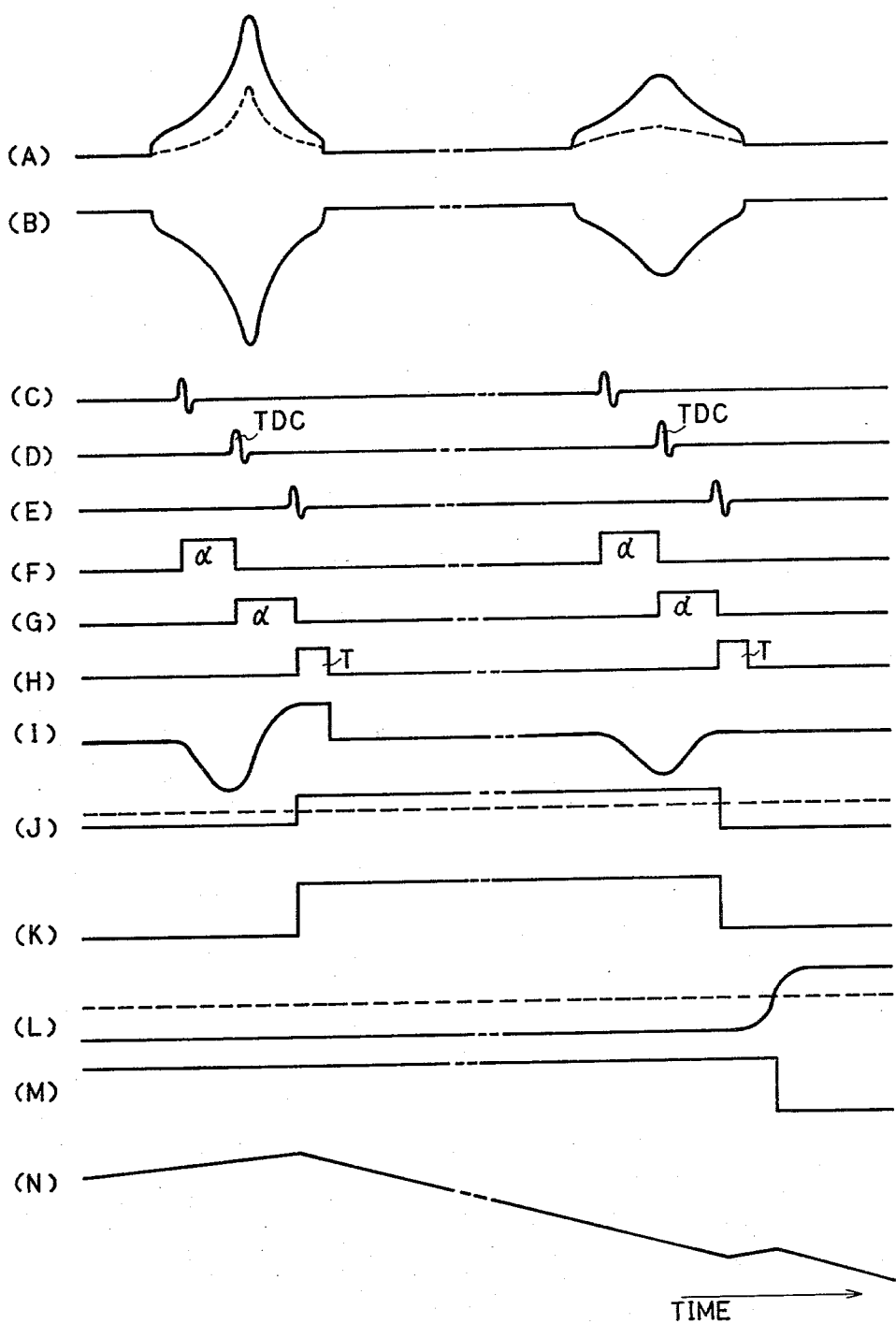

AIR-TO-FUEL RATIO CONTROL APPARATUS

BACKGROUND OF THE INVENTION

The present invention is related to an air-to-fuel ratio control apparatus improved to control the air-to-fuel ratio of a combustible mixture supplied to a combustion engine toward a lean limit in response to the combustion condition of the combustible mixture which is detected by the comparison of the pressures in the engine cylinder produced during the compression and power strokes.

It has been known in the art field related to engine controls that a combustion engine emitts, so long as it attains a complete combustion therein, less amount of the hydrocarbon (HC), carbon monoxide (CO) and nitrogen oxide (NOx) as the air-to-fuel ratio of a combustible mixture becomes a leaner ratio. Keeping the combustible mixture at the leanest possible ratio is effective not only to reduce noxious exhaust emissions but also to enhance fuel economy.

To derive these advantages a closed loop lean limit engine roughness control has been suggested in the U.S. Pat. No. to Taplin et al 3,789,816 issued on Feb. 5, 1974. The engine roughness in rotation is detected and the combustible mixture is responsively feedback-controlled in this patent. The combustible mixture is kept controlled to the leaner ratio so long as the detected engine roughness is small enough. Since the engine roughness is detected in view of the changes in the rotation of an engine output shaft, it is difficult to discriminate whether the engine roughness is resultant from the combustible mixture feedback-controlled to the leaner ratio or from the transient acceleration or deceleration of the combustion engine.

SUMMARY OF THE INVENTION

It is therefore a primary object of this invention to provide an air-to-fuel ratio control apparatus which is improved to feedback-control a combustible mixture supplied to a combustion engine to the leanest possible air-to-fuel ratio in response to a combustion condition in an engine cylinder.

It is a further object of this invention to provide a air-to-fuel ratio control apparatus which is improved to detect a combustion condition in view of pressures in an engine cylinder produced during the compression stroke and the power stroke of a combustion engine.

It is a still further object of this invention to provide an air-to-fuel ratio control apparatus which is improved to prevent the pressure responsive lean limit air-to-fuel ratio control when the combustible mixture is detected to be richer than the stoichiometric ratio.

BRIEF DESCRIPTION OF THE DRAWINGS

In the accompanying drawings:

FIG. 2 is a time chart illustrating waveforms (A) through (N) of output signals developed in the embodiment illustrated in FIG. 1.

DETAIL DESCRIPTION OF THE PREFERRED EMBODIMENT

Figure 1:
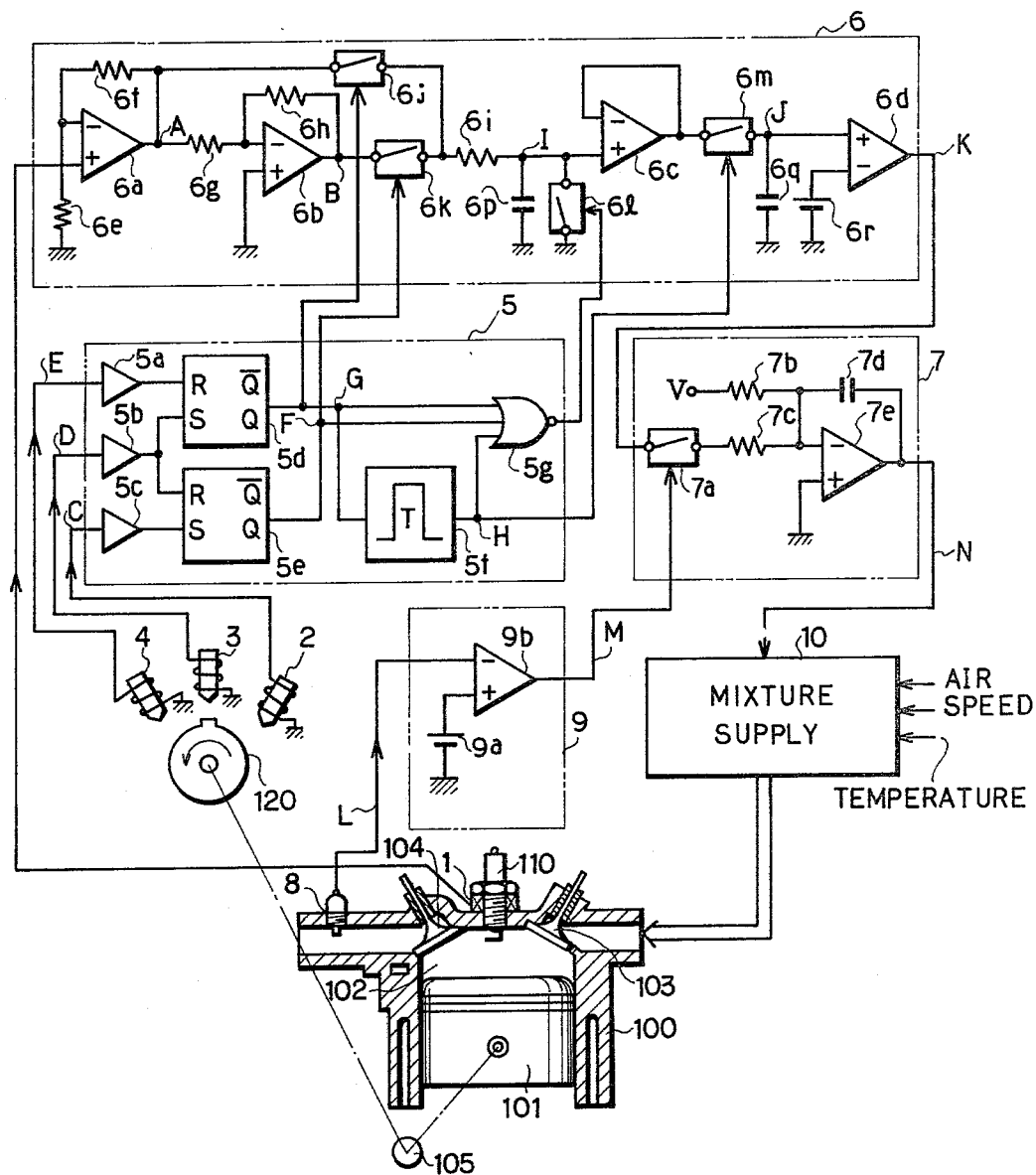
FIG. 1 is an electric wiring diagram illustrating partly in schematic the embodiment of an air-to-fuel ratio control apparatus according to this invention.

Referring first to FIG. 1, an internal combustion engine 100 which is conventional piston-reciprocating four-stroke cycle tuype comprises a piston 101 adapted to reciprocate up and down in a cylinder 102 constituting a combustion chamber, an intake valve 103 positioned between the cylinder 102 and an intake passage, an exhaust valve 104 positioned between the cylinder 102 and an exhaust passage and a crankshaft 105 rotated by the reciprocation of the piston 101. The combustion engine 100 attains the intake, compression, power and exhaust strokes sequencially. The piston 101 moves downward to suck a combustible mixture of air and fuel supplied from a mixture supply device 10 into the cylinder 102 during the intake stroke in which the intake valve 103 is opened and then moves upward from the bottom dead center (BDC) thereof to compress the sucked combustible mixture during the compression stroke in which the intake and exhaust valves 103 and 104 are closed. The combustible mixture is ignited by an ignition spark produced by a spark plug 110 before the piston 101 reaches the top dead center position (TDC) thereof. The piston 101 moves downward from the top dead center position due to the combustion of the ignited combustible mixture during the power stroke in which the intake and exhaust valves 103 and 104 are closed and then moves upward to discharge the combustion resultant exhaust gas from the cylinder 102 during the exhaust stroke in which the exhaust valve 104 is opened. The crankshaft 105 functioning as an output shaft is rotated once in each piston reciprocation.

Associated with the engine 100 is a piezoelectric pressure detector 1 which is a ring washer type in shape and fitted at the neck of the spark plug 110. The pressure detector 1 is responsive to the compressive stress which increases as the pressure in the cylinder 102 increases and it produces an electric pressure signal indicative of the pressure in the cylinder 102. Associated further with the engine 100 are position detectors 2, 3 and 4 arranged along the periphery of a rotor disk 120 which is provided with a projection and is rotated once in two rotations of the crankshaft 105. The position detector 3 is arranged to face the projection of the disk 120 at a timing when the piston 101 reaches the top dead center thereof at the transition from the compression stroke to the power stroke. The position detectors 2 and 4 are arranged to be equally spaced from the position detector 3 in rotation angular interval of the disk 120. The rotation angular interval $\alpha$ is determined to be equal to or smaller than 90 degrees. The position detectors 2, 3 and 4 therefore produce respective a.c. output signals C, D and E in synchronized relation with the rotation of the disk 120, or the reciprocations of the piston 101.

A timing control circuit 5 is connected to the position detectors 2, 3 and 4 to control the operation timings of a combustion monitor circuit 6. The timing control circuit 5 comprises waveform shapers 5a, 5b and 5c, RS flip-flops 5d and 5e, a monostable multivibrator 5f and a NOR gate 5g. The shapers 5a, 5b and 5c are respectively connected to receive the a.c. output signals of the position detectors 4, 3 and 2. The flip-flop 5d is connected to be reset and set by the shapers 5a and 5b respectively, while the flip-flop 5e is connected to be reset and set by the shapers 5b and 5c respectively. The monostable multivibrator 5f is connected to be triggered by the output signal G of the flip-flop 5d. The NOR gate 5g is connected to receive the output signals F and G of the flip-flop 5d and 5e and the output signal H of the monostable multivibrator 5f.

The combustion monitor circuit 6 for monitoring the combustion condition in response to the pressure signal produced from the pressure detector 1 comprises operational amplifiers 6a, 6b and 6c, a comparator 6d, resistors 6e, 6f, 6g, 6h and 6i, anolog switches 6j, 6k, 6l and 6m, capacitors 6p and 6q and a reference signal source 6r. The operational amplifier 6a, constituting a noninverting amplifier in association with the resistors 6e and 6f, is connected to receive the pressure signal produced from the pressure detector 1. The operational amplifier 6b, constituting an inverting amplifier in association with the resistors 6g and 6h, is connected to receive the amplified pressure signal A for inverting the polarity of the amplified pressure signal with the amplification factor 1. The analog switches 6j and 6k are connected to the respective amplifiers 6a and 6b to charge the capacitor 6p through the resistor 6i by either one of the amplified pressure signal A and the inverted amplified pressure signal B. The analog switches 6j and 6k are further connected to the respective flip-flops 5d and 5e of the timing control circuit 5 to be sequentially rendered conductive. The analog switch 6l connected to the NOR gate 5g of the timing control circuit 5 is connected in parallel with the capacitor 6p, which constitutes an integrator in associated with the resistor 6i, to discharge the capacitor 6p therethrough. The operational amplifier 6c functioning as a voltage follower and the analog switch 6m connected to the multivibrator 5f of the timing control circuit 5 are connected between the capacitors 6p and 6q to transfer the output signal I of the capacitor 6p to the capacitor 6q by the closure (conduction) of the analog switch 6m. The comparator 6d is connected to compare the output signal J of the capacitor 6q with the reference signal of the reference signal source 6r. The reference signal is preestablished to correspond to the limit between the complete combustion and the imcomplete combustion of the combustible mixture.

A ratio modulation circuit 7 comprises an analog switch 7a, resistors 7b and 7c, a capacitor 7d and an operational amplifier 7e. The capacitor 7d and the operational amplifier 7e constitute a proportional integrator which receives a positive signal V through the resistor 7b and the output signal K of the combustion monitor circuit 7 through the analog switch 7a and the resistor 7c. With the analog switch 7a being rendered conductive the proportional integrator integrates the output signal K of the combustion monitor circuit 6 and the positive signal V in a positive and negative directions. With the analog switch 7a being rendered nonconductive, on the other hand, the proportional integrator integrates the positive signal V in the negative direction irrespective of the output signal K of the combustion monitor circuit 6.

An oxygen responsive air-to-fuel ratio detector 8 is connected to the analog switch 7a of the mixture modulation circuit 7 through a ratio monitor circuit 9. The ratio detector 8 is positioned to the exhaust passage of the combustion engine 100 to detect the air-to-fuel ratio of the combustible mixture subjected to the combustion in view of the oxygen concentration in the exhaust gases. The ratio monitor circuit 9 comprises a reference signal source 9a which produces a reference signal preestablished to correspond to the stoichiometric air-to-fuel ratio and a comparator 9b which compares the output signal L of the ratio detector 8 with the reference signal.

The mixture supply device 10 such as a carburetor or an electronically-controlled fuel injection device receives the output signal N of the ratio modulation circuit 7 to responsively modulate the air-to-fuel ratio of the combustible mixture supplied to the combustion engine 100. When the electronically-controlled fuel injection device is used as the mixture supply device 10, it determines the basic amount of fuel in response to engine operating conditions such as the amount of sucked air, the rotation speed of the crankshaft 105 and the temperature of the engine coolant and modulates the basic amount of fuel in response to the output signal N of the mixture modulation circuit 7.

In operation the piezoelectric pressure detector 1 produces the electric pressure signal shown in a phantom form in (A) of FIG. 2 and the position detectors 2, 3 and 4 produce the respective a.c. output signals C, D and E shown in (C), (D) and (E) of FIG. 2. The pressure signal of the pressure detector 1 changes only during the compression and power strokes of the combustion engine 100 with both the intake and exhaust valves 103 and 104 being closed. In more detail, the pressure signal keeps increasing during the compression stroke and, after having attained a maximum value, keeps decreasing during the power stroke. When the complete combustion is attained on the supplied combustible mixture, the maximum combustion pressure in the engine cylinder 102 is produced during the power stroke, or during the piston downward movement from the top dead center. When the complete combustion is not attained to result in a misfire or imcomplete combustion, the maximum combustion pressure is produced at the transition from the compression to power strokes, or at the substantial piston top dead center position. It should be understood therefore that the left hand phantom waveforms and the right hand phantom waveforms in (A) of FIG. 2 respectively represent the complete combustion and the misfire in the cylinder 102.

The a.c. output signals C, D and E produced sequentially by the position detectors 2, 3 and 4 are shaped by the shapers 5a, 5b and 5c into respective pulses synchronized with the a.c. output signals C, D and E. Being set by the pulse of the shaper 5c and thereafter reset by the pulse of the shaper 5b, the flip-flop 5e produces the output pulse F shown in (F) of FIG. 2. Being set by the pulse of the shaper 5b and thereafter reset by the pulse of the shaper 5a, the flip-flop 5d produces the output pulse G shown in (G) of FIG. 2. It should be noticed in FIG. 2 that the output pulses F and G have the same rotation angular interval $\alpha$ before and after the piston top dead center position. Since the rotation speed of the crankshaft 105 changes very little between the successive compression and power strokes of the combustion engine 100, the time intervals of the output pulses F and G are substantially equal to each other. The monostable multivibrator 5f is triggered by the trailing edge of the output pulse G and produces the output pulse H having a constant time interval T as shown in (H) of FIG. 2. The NOR gate 5g, receiving the output pulses F, G and H produces the output pulse only while none of the output pulses F, G and H are produced.

The pressure signal produced by the pressure detector 1 and applied to the combustion monitor circuit 6 is amplified by the operational amplifier 6a to result in the amplified signal A shown in (A) of FIG. 2. The polarity of the amplified pressure signal A is then inverted by the operational amplifier 6b to result in the inverted amplified pressure signal B shown in (B) of FIG. 2. The analog switches 6k and 6j are rendered conductive successively by the output pulses F and G applied from the timing control circuit 5 before and after the piston top dead center position, respectively, so that the capacitor 6p is charged first by the inverted pressure signal B and next by the noninverted pressure signal A. The output signal I of the capacitor 6p keeps decreasing below the ground potential before the piston top dead center position and then keeps increasing from the negative potential after the piston top dead center. Since the noninverted pressure signal A applied to the capacitor 6p after the piston top dead center attains the maximum value after the piston top dead center position in response to the complete combustion, the charging resultant output signal I of the capacitor 6p increases above the ground potential as shown in (I) of FIG. 2. The output signal I, however, does not increase above the ground potential in response to the misfire. The output signal I produced after the successive charging of the capacitor 6p is transferred to the capacitor 6q through the operational amplifier 6c and the analog switch 6m which is rendered conductive during the constant time period T by the output pulse H applied from the timing control circuit 5. The capacitor 6q, sampling thus the output signal I, produces the output signal J shown in (J) of FIG. 2. The output signal J becomes positive when the combustion is attained on the combustible mixture and it decreases as the combustion condition of the combustible mixture approaches the misfire. After the transfer of the output signal I from the capacitor 6p to the capacitor 6m the analog switch 6l is rendered conductive in response to the NOR output signal of the timing control circuit 5 to discharge the capacitor 6p therethrough and the output signal I of the capacitor 6p restores the ground potential as shown in (I) of FIG. 2. The output signal J indicative of the combustion condition of the combustible mixture is compared by the comparator 6d with the reference signal produced by the reference signal source 6r. The reference signal indicative of the limit between the complete and incomplete combustions is shown in phantom form in (J) of FIG. 2. The comparator 6d produces the output signal K in correspondence with the output signal J. The output signal K becomes high and low as shown in (K) of FIG. 2 in response to the output signal J being above and below the reference signal, respectively.

While the abovedescribed operation is accomplished, the oxygen responsive ratio detector 8 produces the output signal L in correspondence with the oxygen concentration in the exhaust gases. The output signal L becomes comparatively low and high to indicate the rich mixture and the lean mixture in response to the existence and the absence of oxygen, respectively, as shown in (L) of FIG. 2. The output signal L indicative of the air-to-fuel ratio of the supplied mixture is applied to the ratio monitor circuit 9 to be compared by the comparator 9b with the reference signal produced by the reference signal source 9a. The reference signal indicative of the stoichiometric air-to-fuel ratio is shown in phantom form in (L) of FIG. 2. The comparator 9b produces the output signal M, as shown in (M) of FIG. 2, which becomes high and low to indicate that the detected air-to-fuel ratio of the combustible mixture is leaner and richer than the stoichiometric ratio. The output signal M is applied to the ratio modulation circuit 7.

So long as the output signal M is high in magnitude to indicate that the combustible mixture is leaner than the stoichiometric ratio, the analog switch 7a is rendered conductive so that the output signal K of the combustion monitor circuit 6 is applied to the proportional integrator comprising the amplifier 7e and the capacitor 7d. The integrator, integrating the output signal K in the positive or negative direction, produces the output signal N. The output signal N increases and decreases in response to the low magnitude and the high magnitude of the output signal K, respectively, as shown in (N) of FIG. 2. While the output signal N keeps decreasing in response to the complete combustion, the mixture supply device 10 responsively decreases the amount of fuel so that the air-to-fuel ratio of the combustible mixture is resultantly controlled to the leaner ratio. Provided that the complete combustion is not attained on the combustible mixture controlled to the leaner ratio, the mixture supply device 10 controls, by increasing the amount of fuel, the combustible mixture of the richer ratio in response to the increasing output signal N so that the misfire is not caused on the too-lean combustible mixture. It should be noticed that, since the positive signal V is also applied to the proportional integrator in the ratio modulation circuit 7, the decreasing speed of the output signal N is larger than the increasing speed to result in the speedy control toward the leanest possible air-to-fuel ratio.

Contrary to the abovedescribed pressure responsive air-to-fuel ratio control, the combustible mixture is controlled toward the leaner ratio in response to the low magnitude of the output signal M indicating that combustible mixture is richer than the stoichiometric ratio. The proportional integrator in the ratio modulation circuit 7 integrates the positive signal V with the analog switch 7a being rendered nonconductive and produces the decreasing output signal N as shown in (N) of FIG. 2. As a result the mixture supply device 10 decreases the amount of fuel to control the combustible mixture richer than the stoichiometric ratio toward the leaner ratio. When the combustible mixture is thus controlled to be leaner than the stoichiometric ratio, the abovedescribed pressure responsive closed loop air-to-fuel ratio control is attained. This oxygen responsive air-to-fuel ratio control is advantageous when the incomplete combustion on the too-rich combustible mixture occurs.

Although the abovedescribed embodiment is referred to the piston reciprocating 4-stroke cycle combustion engine, the present invention is applicable as well to other types of combustion engines such as the piston reciprocating 2-stroke cycle engine and the rotary piston engine. Various modifications or alterations may be attained with ease without departing from the spirit of this invention.

What I claim is:

1. An air-to-fuel ratio control apparatus for a combustion engine which sequentially attains a compression stroke and a power stroke therein to rotate the output shaft thereof comprising:
   mixture supply means responsive to the operating conditions of said combustion engine and effective to supply the cylinder of said combustion engine with a combustible mixture of air and fuel;
   position detection means responsive to the rotation of said output shaft and effective to sequentially produce first, second and third position signals in synchronization with the rotation of said output shaft to respective first, second and third rotational positions, said second rotational position being predetermined to correspond to the transition from said compression stroke to said power stroke in said combustion engine, and said first and third rotational positions being predetermined to be spaced equally from said second rotational position such that said first and third position signals are produced during said compression and power strokes, respectively;

pressure detection means responsive to a pressure in said cylinder of said combustion engine and effective to produce a pressure signal changing in correspondence with the change of said pressure in said cylinder;

combustion monitor means responsive to said first, second and third signals and effective to compare a first portion of said pressure signal produced during a first time interval determined by said first and second position signals with a second portion of said pressure signal produced during a second time interval determined by said second and third position signals, said combustion monitor means producing a combustion monitor signal indicative of the presence or the absence of a complete combustion on said combustible mixture supplied to said cylinder; and ratio modulation means responsive to said combustion monitor signal and effective to modulate said mixture supply means such that the air-to-fuel ratio of said combustible mixture is controlled to leaner and richer ratios in respective response to said combustion monitor signal indicative of the presence and the absence of said complete combustion in said cylinder.

2. An air-to-fuel ratio control apparatus according to claim 1, wherein said combustion monitor means includes:

inverting means responsive to said pressure signal and effective to produce an inverted pressure signal which is opposite to said pressure signal in polarity;

a capacitor;

first charging means responsive to said first and second position signals and effective to charge said capacitor by one of said pressure signal and said inverted pressure signal during said first time interval;

second charging means responsive to said second and third position signals and effective to charge said capacitor by the other of said pressure signal and said inverted pressure signal during said second time interval; and comparing means responsive to said third position signal and effective to compare the output signal produced by said capacitor in timed relation with said third position signal with a reference signal predetermined to indicate the limit between the existence and the absence of said complete combustion in said cylinder such that said combustion monitor signal is produced in correspondence with the comparison result thereof.

3. An air-to-fuel ratio control apparatus according to claim 1 or 2, wherein said ratio modulation means includes:

integrating means responsive to said combustion monitor signal and effective to integrate said combustion monitor signal in one and the other directions between an increasing and decreasing directions in respective response to said combustion monitor signal indicative of the presence and the absence of said complete combustion in said cylinder such that the air-to-fuel ratio of said combustible mixture is controlled in proportion to the integration result.

4. An air-to-fuel ratio control apparatus for a combustion engine which sequentially attains a compression stroke and a power stroke therein for a supplied combustible mixture to rotate the output shaft thereof comprising:

mixture supply means for supplying the cylinder of said combustion engine with the combustible mixture in accordance with the operating conditions of said combustion engine;

rotation detection means for detecting the rotation of said output shaft to a first, second and third rotational positions, said second rotational position being predetermined to correspond to the transition from said compression stroke to said power stroke in said combustion engine, and said first and third rotational positions being predetermined to be spaced equally from said second rotational position such that said output shaft rotates to said first and third rotational positions during said compression and power strokes, respectively;

pressure detection means for detecting a pressure in said cylinder of said combustion engine;

combustion monitor means for monitoring the combustion condition in said cylinder by comparing two pressures one and the other of which are detected by said pressure detection means during the rotation of said output shaft from said first to said second rotational positions and from said second to said third rotational positions, respectively, said combustion monitor means detecting the existence and the absence of the complete combustion in said cylinder when said the other of said two pressures is larger than and equal to said one of said two pressures;

oxygen detection means for detecting the presence and the absence of oxygen in the exhaust gas of said combustion engine;

ratio modulation means for modulating the mixture ratio of said combustible mixture supplied from said mixture supply means, said ratio modulation means controlling said mixture ratio to a leaner and richer ratio in response to the existence and the absence of said complete combustion, respectively, when the presence of oxygen is detected by said oxygen detection means, and said ratio modulation means controlling said mixture ratio to a leaner ratio irrespective of the presence and the absence of said complete combustion when the absence of oxygen is detected by said oxygen detection means.

* * * * *